United States Patent [19]

Videen

[11] 4,232,480
[45] Nov. 11, 1980

[54] METHOD AND DEVICE FOR COLORING BULK HYDRO MULCH FIBERS
[75] Inventor: Otis R. Videen, Roseville, Minn.
[73] Assignee: Conwed Corporation, St. Paul, Minn.
[21] Appl. No.: 38,500
[22] Filed: May 14, 1979
[51] Int. Cl.³ .............................................. A01G 7/00
[52] U.S. Cl. ............................................. 47/9; 47/58
[58] Field of Search ........................................ 47/9, 58
[56] References Cited
U.S. PATENT DOCUMENTS

| | | | |
|---|---|---|---|
| 3,091,436 | 5/1963 | Finn | 47/9 X |
| 3,125,294 | 3/1964 | Lill | 47/9 X |
| 3,214,866 | 11/1965 | Halleck | 47/58 |
| 3,218,149 | 11/1965 | Sproull et al. | 47/9 X |
| 3,881,278 | 5/1975 | Videen | 47/58 |
| 4,067,140 | 1/1978 | Thomas | 47/9 |

Primary Examiner—Robert E. Bagwill
Attorney, Agent, or Firm—Eyre, Mann, Lucas & Just

[57] ABSTRACT

A viscous liquid containing dye and possibly further additives is added to a package of hydraulic mulch material for hydraulic mulching. The viscous liquid and its additives are suitable to be later uniformly mixed through the hydraulic mulch during subsequent mixing and agitation with water prior to application, thereby eliminating the need for precoloring of the mulch material.

9 Claims, No Drawings

METHOD AND DEVICE FOR COLORING BULK HYDRO MULCH FIBERS

BACKGROUND OF THE INVENTION

Preventing water and wind erosion of soil has employed the deposition of usually fibrous material on the soil. The fibrous material may be simply strewn as bagasse, straw, sawdust, excelsior and may be held in place by suitable binders mixed with the material or sprayed on afterward. One frequently seen mulching technique is the spreading of straw which is then retained in position by being sprayed with tar. The straw tends to hold the earth in position against wind and water erosion until vegetation can take root and flourish. The ground is often treated with fertilizers and/or soil conditioners and seeded before the application of the straw and tar.

The large-scale application of straw such as in highway and strip mine restoration requires at least two vehicles, namely one for spreading straw and one for spraying tar, with their drivers and crews. This usually totals five to seven men. In addition, due to the high bulk of the straw, one or two trucks with drivers are required to deliver the straw to the site.

The high cost and high labor involved in the application of straw and the like for the prevention of erosion has encouraged the growth of hydraulic mulching in which a hydraulic mulch forming fibrous material is mixed in a thin slurry with water and is thereupon transferred to the point of application either by being expelled at high velocity from a nozzle or being directly deposited upon the soil. The hydraulic mulch forming material may consist of ground waste paper, mechanically comminuted wood, partially digested or fully digested paper pulp with or without the lignin removed, or the like. The hydraulic mulch forming material may contain binders such as polyacrylonitrile or other types to aid the mulch in forming a cohesive blanket over the ground, or alternatively the mulch may be deposited without binder and thereupon depend upon intimate and complete coverage of the ground to prevent water or wind erosion.

The hydraulic mulch may contain additional materials such as seed, fertilizer, pesticides, and herbicides or sizing to provide waterproofing qualities to the deposited material. These may all be mixed with the water which forms the slurry and be deposited on the ground at the same time. One advantage of depositing seed and fertilizer together with the mulch is that the seed becomes scarified during the mixing and pumping operation which contributes to the likelihood of germination. Another advantage is that they do not have to be applied in a separate operation. Depositing fertilizer and excess water along with the seed provides a favored environment in which the seed can germinate.

The mulch is customarily prepared as a dry granular material packed in suitable containers such as, for example, paper bags containing fifty pounds of the dry material. In the process of preparation of the dry material, depending upon the type of mulch involved, the material is finely divided either by mechanical comminution or chemical digestion. In certain processes, the material is washed to remove chemical or other products and is dried before being packaged.

Coloring material, usually a green dye, is added to the mulch before drying and packaging. The coloring material serves a number of useful purposes during and after application. The color helps the operator spreading the slurry to spread the material evenly. It provides visual metering which the operator can use to see if the material is spread evenly, thoroughly, and to the proper thickness for uniform, high quality turf. The color also provides an aesthetic benefit while germination is taking place. The green mulch mat gives a pleasant almost finished look to a newly seeded area. Some of the coloring materials used lose their color in direct sunlight in a few days to a few weeks. This gradual loss of color is complementary to the increase in color occurring due to the germination and growth of the turf being established.

The dye is added as an aqueous solution during the forming of the fibrous portion of the hydraulic mulching material. As described in U.S. Pat. No. 3,881,278, incorporated herein by reference, vegetable material is defibrated in steam in a defibrator, whereafter it goes to a cyclone for steam removal and then to a drier for removal of water from the fiber. The dyes are added in aqueous solution between the defibrator and the drier, usually by pumping a dilute solution into the fiber discharge pipe on the defibrator machine. The process is, unfortunately, very messy because the dye solution must be handled in concentrated form, be diluted in a large tank and then be pumped and metered into the fiber system. It has been found that mixing and adding the dye is a messy process resulting in a large area around the processing region being stained with the dye. In addition to the mess which is encountered, the addition of the dye in a dilute medium adds undesirable water to the fiber which must then be driven off in the drier. The additional energy required for this drying is highly undesirable from both cost and fuel conservation points of view. Furthermore, most dyes commonly used in this operation are heat sensitive and therefore have a tendency to lose some of their color through fading during the drying process. To compensate, additional dye must be added to the material. This also results in extra cost.

SUMMARY OF THE INVENTION

The applicant has discovered a method of preparing dry hydraulic mulch which offers all of the advantages of the prior art but overcomes the disadvantages. In the improved hydraulic mulch, the applicant avoids adding a dye to the defibrated material from a dilute dye solution. This eliminates the problem of contaminating the area with dye as well as the additional problem of drying the water added with the dye and the problem of dye fading due to heat.

Hydraulic mulch materials are usually sold in dry form in containers such as bags, barrels or the like. According to the present invention, the dye is added to the hydraulic mulch material after it is in the container. Because the dry mulch is admixed with water before it is spread, this provides the necessary means for dispersing the dye throughout the mulch material.

The dye material may be added to the mulch in the container in dry form or in aqueous solution, or it may be added as a water soluble capsule or tablet. However, each of these has a disadvantage. With respect to adding the dye dry, this tends to be very messy and the dust usually associated with dry dyes tends to make all of the workers in the area turn green. Adding the dye in a water solution overcomes the dusting problem. However, because of the thinness of water it has been found that the dye tends to absorb into the inner parts of the vegetable fibers and be difficult to disperse when the mulch is mixed with water unless there is quite violent mixing for a longer time than is usually done. Capsules or tablets overcome the problem of absorption into the fibers but they involve additional manufacturing costs as well as taking a relatively long time to dissolve and disperse.

It has been discovered that all of the foregoing disadvantages can be overcome by adding the dye in a viscous liquid.

The mass of dye is formed by mixing the dye with water and a thixotropic, water soluble binder such as hydroxypropyl cellulose, carboxymethyl cellulose, guar latex, etc. The dye is thickened with the thickener to a viscosity of between about 100 centipoises (cps) and 10,000 cps and preferably between 500 cps and 2,000 cps, with the best results being obtained between 750 cps and 1500 cps, all at 20° C. The thickened mass is added to the mulch material in one or more increments at the rate of from about 0.5 to about 5.0 pounds of dry dye per ton of dry fiber. Where the mulch material is packaged in containers such as, for example, fifty pound bags, one or more increments of the thickened dye are deposited directly on the fiber in the container just before the container is sealed.

The thickener must be of the type that will permit the dye to readily dissolve in water, particularly cold water such as that available from watermains, lakes, ponds and streams. It has been found that this solubilizing can be enhanced by adding a dispersion-promoting agent to the dye and thickener to increase the rate at which the dye becomes dissolved in the water of the slurry. The dispersion-promoting material may be of any type known in the art which is compatible with the mulch, dye and thickener and which promotes the dispersion of the dye through the water of the slurry. For example, a low foaming surfactant such as Pluronic L-31 may be added to the thickened dye in an amount equal to from about 50% to about 100% of the weight of the dry dye powder.

The method of addition of the dye to the packaged product is not overly important. However, it should be accomplished with a minimum of mess, since one of the objects of the present invention is to reduce messiness. It has been found that when using a viscous liquid the dye can easily be added with commercially available equipment which measures an exact amount of the viscous liquid and then discharges the same into the container holding the fiber mulch.

DETAILED DESCRIPTION OF THE PREFERRED EMBODIMENT

EXAMPLE 1

To a 1.25% solution of hydroxypropyl cellulose in water was added sufficient Basic Green 4 liquid dye to make a dry dye concentration of 6.6%. This solution was let stand until it became thickened. 0.5 grams of the thickened dye concentrate was added to 50 grams of uncolored mechanically comminuted aspen wood mulch fiber in a container and allowed to stand for two weeks to simulate normal storage conditions. The fiber and dye were thereafter dispersed in water to form a slurry having about 4% solid material. The dye quickly dissolved in the slurry and the entire mass of fiber was found to be uniformly colored after draining off the water.

EXAMPLE 2

Example 1 was repeated except that no hydroxypropyl cellulose was used. All other conditions were the same. While this method of addition of the dye was also found to work, it was observed that the fiber was not nearly as brilliant in color as the fiber of Example 1. It is believed that the reason for this is that in this example some of the dye penetrated the interior of the cellulose fibers after it was applied and this was not released during dispersion, whereas in Example 1 the thickening agent kept virtually all of the dye from penetrating into the interior of the fibers and thus it was virtually all distributed during dispersion.

EXAMPLE 3

A thickened dye solution was prepared in the same way as in Example 1, and 1 gram was added to 50 grams of uncolored mulch fiber in a container. The fiber and dye clump was dispersed in a water slurry having about 4% solid matter. The entire mass of fiber was observed to be even more brilliantly colored than in Example 1.

The most important aspect of the present invention is that the dye be added to the hydraulic mulch material after the hydraulic mulch material is in its shipping container. By the term "shipping container" it is meant that container in which the goods are finally packaged and would normally be shipped to the site of application. As mentioned, these could suitably be 50 lb. Kraft bags, fiberboard drums or the like. It is only when the hydraulic mulch has been put into the shipping container that the present invention can be advantageously employed since it is only at this point that the exact quantity of hydraulic mulch material is known.

It will be understood that the claims are intended to cover all changes and modifications of the preferred embodiments of the invention herein chosen for the purpose of illustration which do not constitute departures from the spirit and scope of the invention.

What is claimed is:

1. In the process for preparing a hydraulic mulch wherein defibrated vegetable materials are packaged in a shipping container with a dye, the improvement comprising addition of the dye to the defibrated vegetable material after the defibrated vegetable material is in its shipping container.

2. The process of claim 1 wherein the dye is added in liquid form.

3. The process of claim 2 wherein the dye is added as a viscous liquid with a viscosity of about 100 to about 10,000 centipoises, at 20° C.

4. The process of claim 3 wherein the viscosity is from about 500 to about 2,000 centipoises.

5. The process of claim 3 wherein the viscosity is from about 750 to about 1,500 centipoises.

6. The process of claim 3 wherein the viscous liquid further includes a dispersing agent.

7. The process of claim 6 wherein the dispersing agent is a low foaming surfactant.

8. In a shipping container having a hydraulic mulch therein, said hydraulic mulch including defibrated vegetable material, the improvement comprising dye in concentrated form being present in a localized area thereof.

9. The shipping container of claim 8 wherein substantially none of the dye is absorbed into the interior of the vegetable material.

* * * * *